(12) United States Patent
Luo et al.

(10) Patent No.: US 11,429,817 B2
(45) Date of Patent: Aug. 30, 2022

(54) NEURAL NETWORK MODEL TRAINING METHOD AND DEVICE, AND TIME-LAPSE PHOTOGRAPHY VIDEO GENERATING METHOD AND DEVICE

(71) Applicant: TENCENT TECHNOLOGY (SHENZHEN) COMPANY LIMITED, Shenzhen (CN)

(72) Inventors: Wenhan Luo, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 48 days.

(21) Appl. No.: 16/892,587

(22) Filed: Jun. 4, 2020

(65) Prior Publication Data
US 2020/0293833 A1 Sep. 17, 2020

Related U.S. Application Data

(63) Continuation of application No. PCT/CN2019/076724, filed on Mar. 1, 2019.

(30) Foreign Application Priority Data

Mar. 26, 2018 (CN) .......................... 201810253848.3

(51) Int. Cl.
*G06K 9/62* (2022.01)
*G06N 3/04* (2006.01)
(Continued)

(52) U.S. Cl.
CPC .......... *G06K 9/6265* (2013.01); *G06K 9/6256* (2013.01); *G06N 3/0454* (2013.01); *G06N 3/088* (2013.01); *G06V 20/41* (2022.01)

(58) Field of Classification Search
CPC .. G06K 9/6265; G06K 9/6256; G06N 3/0454; G06N 3/088; G06N 3/0472;
(Continued)

(56) References Cited

U.S. PATENT DOCUMENTS 7,289,127 B1 10/2007 Zimmer et al.
2017/0180589 A1* 6/2017 Guo ..................... H04N 5/2351
(Continued)

FOREIGN PATENT DOCUMENTS

CN 102737369 10/2012
CN 106779073 5/2017
(Continued)

OTHER PUBLICATIONS

Xiong et al., "Learning to Generate Time-Lapse Videos Using Multi-stage Dynamic Generative Adversarial Networks," Dec. 2, 2017 (Year: 2017).*
(Continued)

*Primary Examiner* — John W Lee
(74) *Attorney, Agent, or Firm* — Crowell & Moring LLP

(57) ABSTRACT

The present disclosure describes methods, devices, and storage medium for generating a time-lapse photography video with a neural network model. The method includes obtaining a training sample. The training sample includes a training video and an image set. The method includes obtaining through training according to the training sample, a neural network model to satisfy a training ending condition, the neural network model comprising a basic network and an optimization network, by using the image set as an input to the basic network, the basic network being a first generative adversarial network for performing content modeling, generating a basic time-lapse photography video as an output of the basic network, using the basic time-lapse photography video as an input to the optimization network,
(Continued)

the optimization network being a second generative adversarial network for performing motion state modeling, and generating an optimized time-lapse photography video as an output of the optimization network.

14 Claims, 10 Drawing Sheets

(51) Int. Cl.
  *G06N 3/08* (2006.01)
  *G06V 20/40* (2022.01)
  *G06T 15/20* (2011.01)
(58) Field of Classification Search
  CPC .......... G06N 3/08; G06V 20/41; G06V 20/49; G06T 15/20
  See application file for complete search history.

(56) References Cited

U.S. PATENT DOCUMENTS

2017/0286774 A1* 10/2017 Gaidon .................. G06V 10/10
2018/0103056 A1* 4/2018 Kohout ............... H04L 63/1416

FOREIGN PATENT DOCUMENTS

| | | |
|---|---|---|
| CN | 107624243 | 1/2018 |
| JP | 2015142327 | 8/2015 |
| JP | 2018006828 | 1/2018 |

OTHER PUBLICATIONS

International Search Report with English translation and Written Opinion regarding PCT/CN2019/076724 dated May 29, 2019, 9 pages.

Extended European Search Report EP 19 778365 dated Nov. 15, 2021.

Xiong et al, "Learning to Generate Time-Lapse Videos Using Multi-stage Dynamic Generative Adversarial Networks," Dec. 2, 2017, 2364-2373, XP055860458, DOI: 10.1109/CVPR.2018.00251 ISBN: 978-1-5386-6420-9, Retrieved from the Internet: URL:https://arxiv.org/pdf/1709.07592v2.pdf.

Xiong et al., "Learning to Generate 1-14 Time-Lapse Videos Using Multi-stage Dynamic Generative Adversarial Networks,", 2018 IEEE/CVF Conference on Computer Vision and Pattern Recognition, IEEE, Jun. 18, 2018, pp. 2364-2373, XP033476202, DOI 10.1109/CVPR.2018.00251 [retrieved on Dec. 14, 2018] * the whole document*.

Japanese Office Action with machine translation regarding JP2020-568019 dated Sep. 29, 2021.

* cited by examiner

NEURAL NETWORK MODEL TRAINING METHOD AND DEVICE, AND TIME-LAPSE PHOTOGRAPHY VIDEO GENERATING METHOD AND DEVICE

RELATED APPLICATION

This application is a continuation application of PCT Patent Application No. PCT/CN2019/076724, filed on Mar. 1, 2019, which claims priority to Chinese Patent Application No. 201810253848.3, filed with the Chinese Patent Office on Mar. 26, 2018, both of which are incorporated herein by reference in their entireties.

FIELD OF THE TECHNOLOGY

This application relates to the field of artificial intelligence technologies, and in particular, to a neural network model training method, a time-lapse photography video generating method, and a corresponding apparatus, system, device, storage medium, and computer program product.

BACKGROUND OF THE DISCLOSURE

Time-lapse photography is a time-compressed photography technology. The time-lapse photography is taking a set of pictures, and connecting the pictures through post-processing, to compress the process of minutes, hours or even days or years in a short period of time and play the process in a video form. Currently, a time-lapse photography video generating method is still in a stage of academic research, and is mainly implemented through a neural network model. However, a video generated in the method is vague in content, relatively poor in reality, and difficult to meet user requirements. Therefore, the method has not been widely used.

SUMMARY

In view of this, embodiments of this application provide a neural network model training method and a time-lapse photography video generating method, which can generate a clear and smooth time-lapse photography video with high reality, meet user requirements, and have wider application prospects. This application further provides a corresponding apparatus, system, device, storage medium, and computer program product.

The present disclosure describes a method for generating a time-lapse photography video with a neural network model. The method includes obtaining, by a device, a training sample. The training sample includes a training video and an image set corresponding to the training video. The image set includes an end image in the training video, and the image set includes a first preset quantity of frames. The device includes a memory storing instructions and a processor in communication with the memory. The method includes obtaining, by the device, through training according to the training sample, a neural network model to satisfy a training ending condition, the neural network model comprising a basic network and an optimization network, by using the image set as an input to the basic network, the basic network being a first generative adversarial network for performing content modeling, generating a basic time-lapse photography video as an output of the basic network, using the basic time-lapse photography video as an input to the optimization network, the optimization network being a second generative adversarial network for performing motion state modeling, and generating an optimized time-lapse photography video as an output of the optimization network.

The present disclosure describes an apparatus for generating a time-lapse photography video with a neural network model. The apparatus includes a memory storing instructions; and a processor in communication with the memory. When the processor executes the instructions, the processor is configured to cause the apparatus to obtain a training sample. The training sample includes a training video and an image set corresponding to the training video, the image set includes an end image in the training video, and the image set includes a first preset quantity of frames. When the processor executes the instructions, the processor is configured to cause the apparatus to obtain, through training according to the training sample, a neural network model to satisfy a training ending condition, the neural network model comprising a basic network and an optimization network, by using the image set as an input to the basic network, the basic network being a first generative adversarial network for performing content modeling, generating a basic time-lapse photography video as an output of the basic network, using the basic time-lapse photography video as an input to the optimization network, the optimization network being a second generative adversarial network for performing motion state modeling, and generating an optimized time-lapse photography video as an output of the optimization network.

The present disclosure describes a non-transitory computer readable storage medium storing computer readable instructions. The computer readable instructions, when executed by a processor, are configured to cause the processor to perform obtaining a training sample. The training sample includes a training video and an image set corresponding to the training video, the image set includes an end image in the training video, and the image set includes a first preset quantity of frames. The computer readable instructions, when executed by a processor, are configured to cause the processor to perform obtaining, through training according to the training sample, a neural network model to satisfy a training ending condition, the neural network model comprising a basic network and an optimization network, by using the image set as an input to the basic network, the basic network being a first generative adversarial network for performing content modeling, generating a basic time-lapse photography video as an output of the basic network, using the basic time-lapse photography video as an input to the optimization network, the optimization network being a second generative adversarial network for performing motion state modeling, and generating an optimized time-lapse photography video as an output of the optimization network.

To achieve the foregoing objective, the embodiments of this application provide the following technical solutions:

A neural network model training method is applied to a server and includes:

obtaining a training sample, the training sample including a training video and an image set corresponding to the training video, and the image set including a head-frame image or an end-frame image in the training video with a first preset quantity of frames;

obtaining, through training according to the training sample, a neural network model meeting a training ending condition, the neural network model including a basic network used for performing content modeling on a time-lapse photography video and an optimization network used for performing motion state modeling on the time-lapse photography video, the basic network being a first generative adversarial network using an image set including the first preset quantity of frames of same images as an input and using a basic time-lapse photography video as an output; and the optimization network being a second generative adversarial network using the output of the basic network as an input and using an optimized time-lapse photography video as an output.

A time-lapse photography video generating method is applied to an electronic device, and includes:

obtaining a specified image;

generating, according to the specified image, an image set including a first preset quantity of frames of the specified images; and performing content modeling and motion state modeling on the image set according to the image set by using a pre-trained neural network model, and obtaining a time-lapse photography video outputted by the neural network model, the neural network model being obtained through training according to the neural network model training method according to this application.

A neural network model training apparatus includes:

an obtaining module, configured to obtain a training sample, the training sample including a training video and an image set corresponding to the training video, and the image set including a head-frame image or an end-frame image in the training video with a first preset quantity of frames; and a training module, configured to obtain, through training according to the training sample, a neural network model meeting a training ending condition, the neural network model including a basic network used for performing content modeling on a time-lapse photography video and an optimization network used for performing motion state modeling on the time-lapse photography video, the basic network being a first generative adversarial network using the image set including the first preset quantity of frames of same images as an input and using a basic time-lapse photography video as an output; and the optimization network being a second generative adversarial network using the output of the basic network as an input and using an optimized time-lapse photography video as an output.

A time-lapse photography video generating apparatus includes:

an obtaining module, configured to obtain a specified image;

a first generating module, configured to generate, according to the specified image, an image set including a first preset quantity of frames of the specified images; and a second generating module, configured to perform content modeling and motion state modeling on the image set according to the image set by using a pre-trained neural network model, to obtain a time-lapse photography video outputted by the neural network model, the neural network model being obtained through training according to the neural network model training method according to this application.

A time-lapse photography video generating system includes:

a terminal and a server, the terminal interacting with the server through a network; and the server being configured to receive a specified image transmitted by the terminal, generate, according to the specified image, an image set including a first preset quantity of frames of the specified images, perform content modeling and motion state modeling on the image set according to the image set by using a pre-trained neural network model, to obtain a time-lapse photography video outputted by the neural network model, and transmit the time-lapse photography video to the terminal, the neural network model being obtained through training according to the neural network model training method according to this application.

An electronic device includes:

a processor and a memory, the memory being configured to store a computer program; and the processor being configured to invoke and execute the computer program stored in the memory, to implement the neural network model training method according to this application, or to implement the time-lapse photography video generating method according to this application.

A storage medium stores a computer program, when executed by a processor, the computer program implementing the steps of the foregoing neural network model training method used for generating a time-lapse photography video, and/or the steps of the foregoing time-lapse photography video generating method.

A computer program product including an instruction, when run on a computer, causes the computer to perform the neural network model training method according to this application, or perform the time-lapse photography video generating method according to this application.

As can be known from the foregoing technical solutions, compared with the related art, this application provides a method for generating a time-lapse photography video by using a dual network structure-based model. The dual network structure specifically includes a basic network used for performing content modeling on a time-lapse photography video and an optimization network used for performing motion state modeling on the time-lapse photography video. The basic network is a first generative adversarial network using a video including a first preset quantity of frames of specified frame images as an input and using a basic time-lapse photography video as an output; and the optimization network is a second generative adversarial network using the output of the basic network as an input and used for performing motion state modeling on the time-lapse photography video, and using an optimized time-lapse photography video as an output. After a plurality of training videos are obtained, image sets corresponding to the training videos are generated according to the training videos. The image set includes a head-frame image or an end-frame image in the training video with a first preset quantity of frames. A neural network model formed by the basic network and the optimization network is trained by using the training videos and the image sets corresponding to the training videos, and when a training ending condition is met, the video may be used for generating the time-lapse photography video.

Specifically, a specified image is obtained, a specified image set including a first preset quantity of frames of the specified images is generated according to the specified image, and then content modeling and motion state modeling are performed on the specified image set by using a pre-trained neural network model, to obtain a time-lapse photography video outputted by the neural network model. According to the method, the time-lapse photography video is continuously optimized by a multi-stage generative adversarial network, and a reasonably predicted future frame or historical frame is ensured for the content modeling and the motion state modeling, to generate the time-lapse photography video from crude to fine gradually. According to the method, on one hand, reality of the content and reasonability of motion information are reserved, so that the generated time-lapse photography video has relatively high reality and is relatively natural. On the other hand, the model used in the method is a cascaded dual network structure, which is easy to implement and simplify and may be applied to a cloud or an offline scenario.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following description show merely the embodiments of this application, and a person of ordinary skill in the art may still derive other drawings from these accompanying drawings without creative efforts.

DESCRIPTION OF EMBODIMENTS

Figure 1:
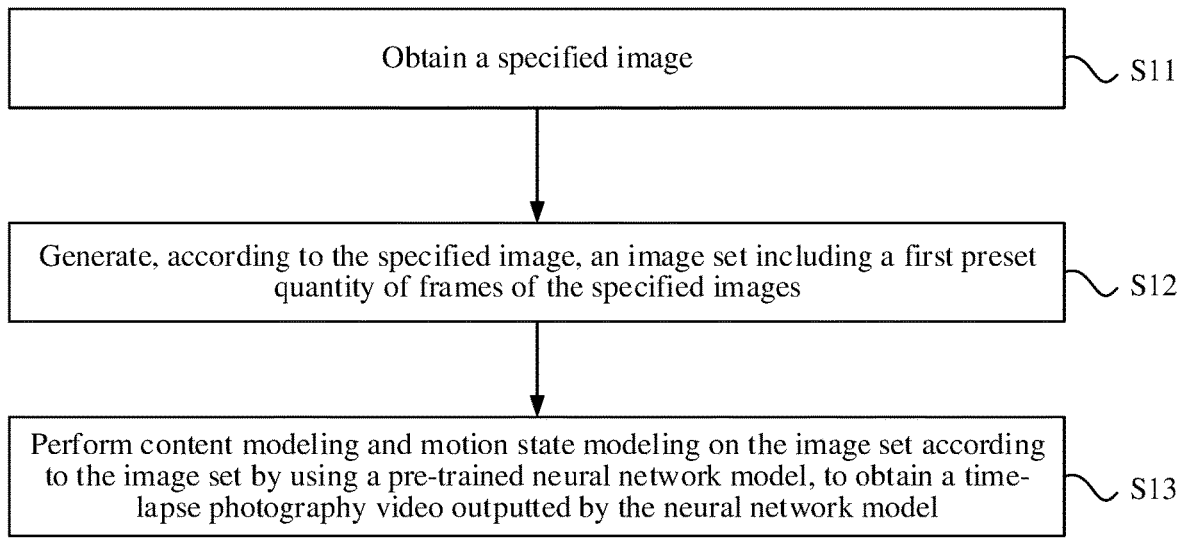
FIG. 1 is a flowchart of a time-lapse photography video generating method according to an embodiment of this application.

The device and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the device and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Unless defined otherwise, all technical and scientific terms used herein have the same meaning as commonly understood by one of skill in the art to which the invention pertains. Although any methods and materials similar to or equivalent to those described herein may be used in the practice or testing of the present invention, the preferred methods and materials are described herein.

Embodiment

An embodiment of this application provides a time-lapse photography video generating method, which may be applied to an electronic device. The electronic device may be a local terminal, or may be a cloud server, or may be a time-lapse photography video generating system formed by a terminal and a server. FIG. 1 is a flowchart of a time-lapse photography video generating method according to an embodiment of this application. As shown in FIG. 1, the method includes the following steps:

Step S11. Obtain a specified image.

When the method is implemented by a terminal, there are two implementations for obtaining the specified image. One implementation is that the specified image is a picture selected from an album. Specifically, the terminal obtains the picture selected from the album as the specified image in response to a selection instruction. Another implementation is that the specified image is a photo taken/shot by a camera in real time. Specifically, the terminal obtains the shot picture as the image in response to a shooting instruction. When the method is implemented by a server, the server receives a time-lapse photography generating request transmitted by the terminal, the time-lapse photography generating request carries the specified image, and the server may obtain the specified image from the time-lapse photography generating request.

Step S12. Generate, according to the specified image, an image set including a first preset quantity of frames of the specified image. The image set may be a specified image set according to the specified image.

This embodiment provides two image set generating manners. One implementation is that the specified image is copied until a quantity of the specified images reaches a first preset quantity, and then the image set is generated according to the first preset quantity of frames of the specified images. Another implementation is that the specified image is obtained repeatedly from a data source, for example, the same image is obtained repeatedly from an album, where the image is the specified image, until the quantity of the specified images reaches a first preset quantity, and then the image set is generated according to the first preset quantity of frames of the specified images.

Optionally, the first preset quantity may be 32, that is, the image set includes 32 specified images. A specific value of the first preset quantity is not limited in this application and may be adjusted according to actual requirements, and a change of the specific value of the first preset quantity does not depart from the protection scope of this application.

Step S13. Perform content modeling and motion state modeling on the image set according to the image set by using a pre-trained neural network model, to obtain a time-lapse photography video outputted by the neural network model.

The neural network model includes a basic network and an optimization network. The basic network is used for performing content modeling on the time-lapse photography video and is a generative adversarial network using the image set including the first preset quantity of frames of the specified images as an input and using a basic time-lapse photography video as an output. For ease of description, it is called a first generative adversarial network. The optimization network is used for performing motion state modeling on the time-lapse photography video and is a generative adversarial network using the output of the basic network as an input, and using an optimized time-lapse photography video as an output. For ease of description, it is called a second generative adversarial network.

The generative adversarial network is a network implemented based on a two-person zero-sum game theory. The network includes a generative model (also called a generator) and a discriminative model (also called a discriminator). The generative model captures a distribution of sample data, and generates sample data similar to real training data by using noise obeying a distribution (for example, a uniform distribution and a Gaussian distribution), and the discriminative model is a binary classifier and is used for estimating a probability of sample data coming from real training data (but not generated data), and if the sample comes from the real training data, a high probability is outputted, otherwise, a small probability is outputted. The generative model is intended to generate sample data same as the real training data, so that the discriminative model cannot discriminate, and the discriminative model is intended to detect the sample data generated by the generative model.

In this embodiment, the electronic device is provided with a neural network model including a basic network and a n optimization network. The image set is inputted into the neural network model, and the basic network of the neural network model performs content modeling on a time-lapse photography video to generate a basic time-lapse photography video, and then the basic time-lapse photography video outputted by the basic network is inputted into an optimization network. The optimization network performs motion state modeling on the time-lapse photography video to output an optimized time-lapse photography video, and the optimized time-lapse photography video is the finally outputted time-lapse photography video.

The video generated by the time-lapse photography video generating method provided by this embodiment may be a video representing the future, or may be a video representing the past, which mainly depends on the used neural network model. If the model predicts a future frame and implements a forward prediction, the video representing the future is generated, and if the model predicts a historical frame and implements a backward prediction, the video representing the past is generated.

For convenience of understanding, description is made below with reference to a simple example. If a user wants to generate a time-lapse photography video representing a blooming process of a flower, a picture of the flower being a flower bud may be used as a specified image. The specified image is copied to obtain a first preset quantity of frames of the specified images to generate an image set, and then the image set is inputted into a neural network model that can predict a future frame. The neural network model can output a time-lapse video of the flower gradually blooming from the flower bud to full bloom.

In some possible implementations, if a user wants to generate a time-lapse photography video representing a blooming process of a flower, a picture of the flower in full bloom may also be used as a specified image. The specified image is copied to obtain a first preset quantity of frames of the specified images to generate an image set, and then the image set is inputted into a neural network model that can predict a historical frame. Because the neural network model can predict the historical frame of the flower before full bloom, the time-lapse video of the flower gradually blooming from a flower bud to full bloom can be outputted.

A neural network model training process is described below.

An embodiment of this application provides a time-lapse photography video generating method. According to the method, content modeling and motion state modeling are performed on an image set including a first preset quantity of frames of specified images by using a pre-trained neural network model to generate a time-lapse photography video. According to the method, the time-lapse photography video is continuously optimized by a multi-stage generative adversarial network, and a reasonably predicted future frame or historical frame is ensured for the content modeling and the motion state modeling, to generate the time-lapse photography video from crude to fine gradually. According to the method, on one hand, reality of the content and reasonability of motion information are reserved, so that the generated time-lapse photography video has relatively high reality and is relatively natural. On the other hand, the model used in the method is a cascaded dual network structure, which is easy to implement and simplify and may be applied to a cloud or an offline scenario.

Specifically, in the foregoing embodiment of this application, a neural network model that has been pre-trained and that is used for generating the time-lapse photography video is used in step S13. It may be understood that the neural network model used for generating the time-lapse photography video needs to be trained in advance. The following describes a training process of the neural network model used for generating the time-lapse photography video.

Figure 2:
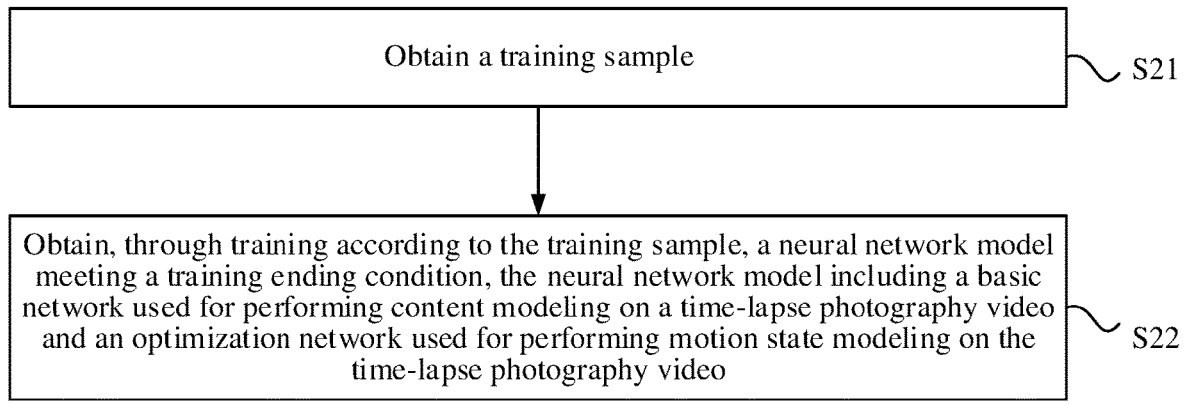
FIG. 2 is a flowchart of a neural network model training method according to an embodiment of this application.

FIG. 2 is a flowchart of a neural network model training method according to an embodiment of this application. As shown in FIG. 2, the method includes the following steps:

Step S21. Obtain a training sample.

The training sample includes a training video and an image set corresponding to the training video. The image set includes an end image (or a terminal image). In one implementation, the end image (or the terminal image) may include a head-frame image or an end-frame image in the training video. In another word, the end image may include a first frame in the training video or a last frame in the training video. The image set may include a first preset quantity of frames. The neural network model is trained usually by using a batch of training samples, and each image included in image sets of the batch of training samples is a head-frame image in the training video, or is an end-frame image in the training video.

The training video is a time-lapse photography video. Specifically, a pre-obtained time-lapse photography video is pre-processed to generate a plurality of qualified training videos, and the plurality of qualified training videos are independent, and non-coincident training videos. Many pre-obtained time-lapse photography video are pre-processed to obtain more qualified training videos.

Optionally, a large quantity of time-lapse photography videos are crawled from the Internet in advance by setting a keyword, and the crawled time-lapse photography videos are generally relatively large. Therefore, the large videos may be segmented into small video clips. During this process, inappropriate training data such as small video clips of which the picture is still, the picture has a large black border, the picture is dark, or the picture is rapidly enlarged or shrunk is removed. After the inappropriate video clips are removed, the remaining video clips may be made into a qualified, independent, and non-coincident training video in a form of making a training video by every first preset quantity of frames. Each of the training video may include the first preset quantity of frames. For example, if a video clip includes 128 frames, and a first preset quantity is 32, the video clip may generate 4 training videos, each of which include 32 frames. Each training video includes a first preset quantity of frames of images, and the first preset quantity may be 32, which is relatively appropriate in magnitude and facilitate training. Certainly, the first preset quantity may be set according to actual requirements. A specific value of the first preset quantity is not limited in this application, and a change of the specific value of the first preset quantity does not depart from the protection scope of this application.

In this embodiment, the training sample may be obtained in the following manners. Specifically, the training video is obtained first, then the head-frame image or the end-frame image is extracted from the training video, to generate an image set corresponding to the training video, and the training video and the image set corresponding to the training video are used as the training sample. After the head-frame image or the end-frame image is extracted from the training video, the image set corresponding to the training video may be generated in two manners. In one manner, the extracted image is copied until a quantity of the images reaches the first preset quantity, and the image set is generated according to the first preset quantity of frames of the images. In another manner, the first preset quantity of frames of the head-frame images, or the first preset quantity of frames of the end-frame images are obtained through extraction for many times, to generate the image set.

Step S22. Obtain, through training according to the training sample, a neural network model meeting a training ending condition.

The neural network model includes a basic network used for performing content modeling on a time-lapse photography video and an optimization network used for performing motion state modeling on the time-lapse photography video. The basic network is a first generative adversarial network using the image set including the first preset quantity of frames of same images as an input and using a basic time-lapse photography video as an output; and the optimization network is a second generative adversarial network using the output of the basic network as an input and using an optimized time-lapse photography video as an output.

In this embodiment, both the basic network and the optimization network are a generative adversarial network. The basic network can perform content modeling on the image set including the first preset quantity of frames of same images, to generate the basic time-lapse photography video. Based on this, the optimization network may further perform motion state modeling on the basic time-lapse photography video, to facilitate continuous optimization, to generate a more real and more natural optimized time-lapse photography video.

Figure 3:
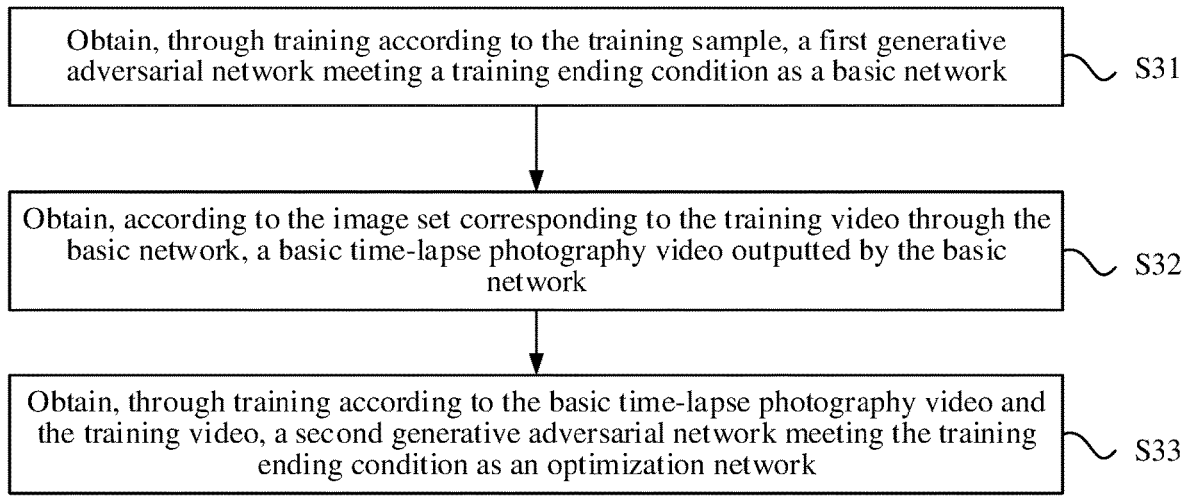
FIG. 3 is a flowchart of another neural network model training method according to an embodiment of this application.

The following describes the process of obtaining, according to the training sample, the neural network model meeting the training ending condition in step S22 in detail. FIG. 3 is a flowchart of another neural network model training method according to an embodiment of this application. As shown in FIG. 3, the method includes the following steps:

Step S31. Obtain, through training according to a training sample, a first generative adversarial network meeting a training ending condition as a basic network.

The training sample includes a training video and an image set corresponding to the training video. The basic network uses the image set as an input, and performs content modeling to output a basic time-lapse photography video, and the basic network uses the generated basic time-lapse photography video close to the training video as a target. In this way, a parameter of the first generative adversarial network may be adjusted based on a degree of similarity between the generated video and the training video, and the first generative adversarial network is optimized by adjusting the parameter continuously. When the training ending condition is met, the first generative adversarial network is used as the basic network.

The training ending condition may be set according to actual requirements, for example, may be that a loss function of the first generative adversarial network is in a convergence state, or a loss function of the first generative adversarial network is less than a preset value. A basic network training process is described in detail below.

Step S32. Obtain, according to the image set corresponding to the training video through the basic network, a basic time-lapse photography video outputted by the basic network.

The basic network uses the image set including a first preset quantity of frames of same images as an input and uses the basic time-lapse photography video as an output. The image set corresponding to the training video may be inputted into the basic network, to obtain the basic time-lapse photography video outputted by the basic network.

Step S33. Obtain, through training according to the basic time-lapse photography video and the training video, a second generative adversarial network meeting a training ending condition as an optimization network. In one implementation, the training end condition in step S33 may be same as the training end condition in step S31. In another implementation, the training end condition in step S33 may be different from the training end condition in step S31.

The optimization network is used for further optimizing the basic time-lapse photography video, and may be obtained through training by the generative adversarial network. In specific implementation, the basic time-lapse photography video and the training video may be used as the training sample, the basic time-lapse photography video may be used as an input, an optimized time-lapse photography video may be used as an output, and the generated optimized time-lapse photography video close to the training video may be used as a target. In this way, a parameter of the second generative adversarial network may be adjusted based on a degree of similarity between the generated optimized time-lapse photography video and the training video, and the second generative adversarial network is optimized by adjusting the parameter continuously. When the training ending condition is met, the second generative adversarial network is used as the optimization network.

The training ending condition may be set according to actual requirements, for example, may be that a loss function of the second generative adversarial network is in a convergence state, or a loss function of the second generative adversarial network is less than a preset value. The training process of an optimization network is described in detail below. After being trained, the basic network and the optimization network are cascaded into the neural network model for generating the time-lapse photography video.

Figure 4:
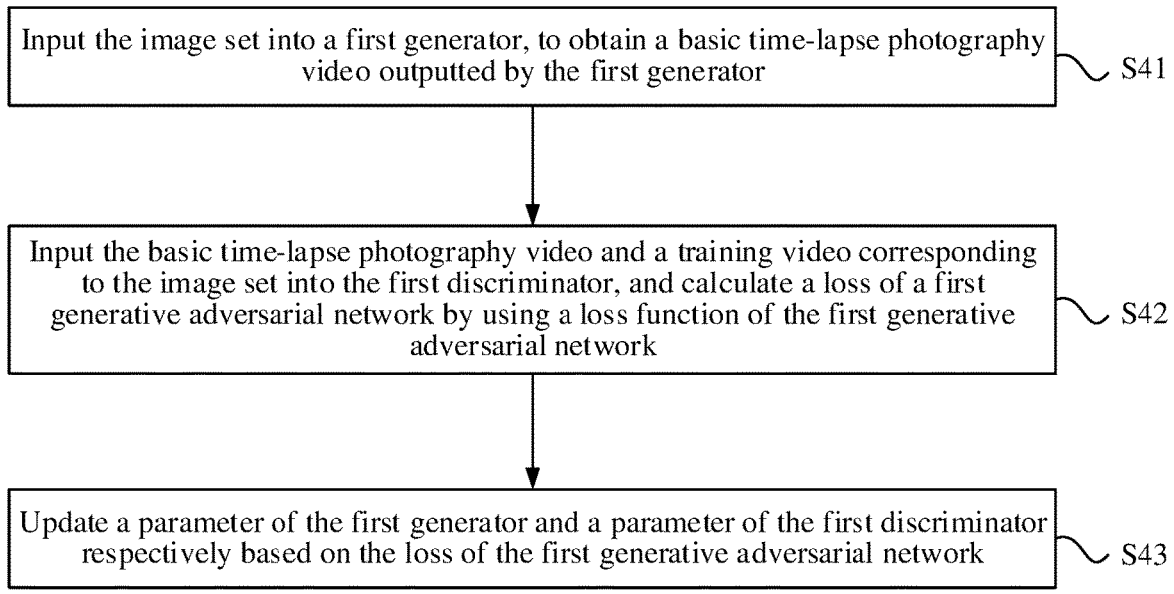
FIG. 4 is a flowchart of a basic network training method according to an embodiment of this application.

The following describes the basic network training process in step S31 in detail. FIG. 4 is a flowchart of a basic network training method according to an embodiment of this application. As shown in FIG. 4, the method includes the following steps:

Step S41. Input the image set into a first generator, to obtain a basic time-lapse photography video outputted by the first generator.

In this embodiment, the basic network includes the first generator and a first discriminator. The first generator is configured to generate the basic time-lapse photography video, and the first discriminator is configured to discriminate whether the basic time-lapse photography video is a real video. If a discrimination result of the first discriminator is that the basic time-lapse photography video is a real video, it indicates that the basic time-lapse photography video generated by the first generator has relatively high reality and is relatively natural.

The first generator may be formed by an encoder and a decoder. In specific implementation, the encoder includes a specified quantity of convolutional layers, and the decoder may include a specified quantity of deconvolutional layers. In this way, the first generator is in a symmetric structure as a whole. The specified quantity may be set according to actual requirements, for example, may be 6. Each convolutional layer may connect to a deconvolutional layer symmetrical to the convolutional layer, so that features of the encoder may be better used. The connection between a convolutional layer and a corresponding devonvolutional layer may be a jumper connection. The first generator of the basic network may process the inputted original image to output a video frame with the same resolution as the inputted original image.

The first discriminator is configured to discriminate between a video (that is, a predicted video) generated by the first generator and the training video (that is, the real video) in the foregoing, to ensure that the first generator generates a more real video. The first discriminator has the same structure as the encoder in the first generator except that an output layer is a binary classification layer. The quantity of the convolutional layers in the first discriminator may be adjusted according to actual requirements. This is not limited in this application.

Figure 5:
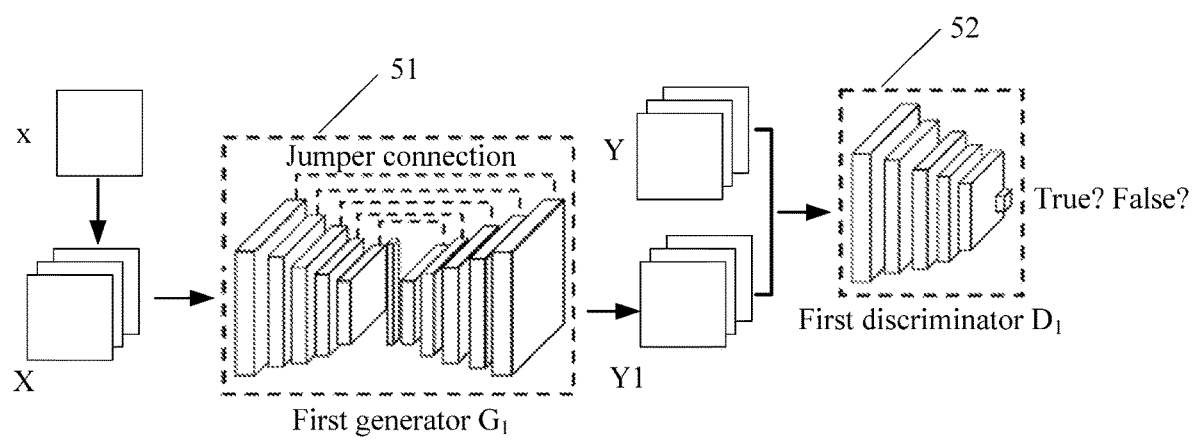
FIG. 5 is a structural diagram of a basic network according to an embodiment of this application.

FIG. 5 is a structural diagram of a basic network according to an embodiment of this application. As shown in FIG. 5, the basic network includes a first generator 51 and a first discriminator 52, x represents a head-frame image or an end-frame image, X represents an image set formed by the head-frame images or an image set formed by the end-head images, Y represents a training video, and Y1 represents a basic time-lapse photography video outputted by the first generator.

Step S42. Input the basic time-lapse photography video and a training video corresponding to the image set into the first discriminator, and calculate a loss of a first generative adversarial network by using a loss function of the first generative adversarial network.

In this embodiment, to ensure that a generator generates a video with relatively high reality, a discriminator, that is, the first discriminator, is used to discriminate between the video generated by the generator and the real video. The first discriminator has a structure similar to that of the encoder in the first generator, and the main difference is that the output layer of the first discriminator is the binary classification layer. The basic time-lapse photography video outputted by the first generator and the training video are inputted into the first discriminator, and the first discriminator calculates a first generative adversarial loss according to the basic time-lapse photography video and the training video.

In this embodiment, the loss of the first generative adversarial network is reduced by adjusting a network parameter, to implement training of the basic network. The loss of the first generative adversarial network includes at least an adversarial loss, and the adversarial loss may be obtained through calculation based on the following formula:

$$L_{adv} = \min_{G_1}\max_{D_1} E[\log D_1(y)] + E[\log(1 - D_1(G_1(X)))]. \quad (1)$$

$L_{adv}$ represents an adversarial loss, E represents an expectation, $D_1$ represents a function corresponding to a first discriminator, $G_1$ represents a function corresponding to a first generator, X represents a four-dimensional matrix corresponding to an image set, and Y represents a four-dimensional matrix corresponding to a training video (to which the image set corresponds). Four dimensions of the four-dimensional matrix are a length of an image, a width of the image, a channel quantity (refers to a quantity of channels of the image, if the image is in an RGB color mode, the quantity of channels is 3), and frames of the image.

$$\min_{G_1}\max_{D_1}$$

represents that: when the adversarial loss of the first generator is calculated, the function $D_1$ of the first discriminator takes a constant (that is, a fixed value), and the function $G_1$ of the first generator takes a maximum value; and when the adversarial loss of the first discriminator is calculated, the function $G_1$ of the first generator takes a constant (that is, a fixed value), and the function $D_1$ corresponding to the first discriminator takes a maximum value.

To ensure that content of the video generated by the first generator is sufficiently real, an L1 norm-based content loss function is further set:

$$L_{con}(G_1)=\|Y-G_1(X)\|_1 \qquad (2).$$

$L_{con}(G_1)$ represents a content loss, $G_1$ represents a function corresponding to a first generator, X represents a four-dimensional matrix corresponding to an image set, Y represents a four-dimensional matrix corresponding to a training video (to which the image set corresponds), and $\|\ \|_1$ represents evaluation of an L1 norm. In one implementation, L1 norm may be a sum of the magnitudes of the vectors in a space. It is the most natural way of measure distance between vectors, that is the sum of absolute difference of the components of the vectors.

That is, the loss of the first generative adversarial network may be a sum of the adversarial loss and the L1 norm-based content loss.

Step S43. Update a parameter of the first generator and a parameter of the first discriminator respectively based on the loss of the first generative adversarial network.

Specifically, a gradient of each layer is calculated by using the loss of the first generative adversarial network, and the parameter of the first generator and the parameter of the first discriminator (for example, a weight and an offset) are updated. The first generative adversarial network is trained by continuously updating the parameter of the first generator and the parameter of the first discriminator. When the training ending condition is met, for example, the loss of the first generative adversarial network is in the convergence state, or is less than the preset value, the first generative adversarial network may be determined as the basic network.

Figure 6:
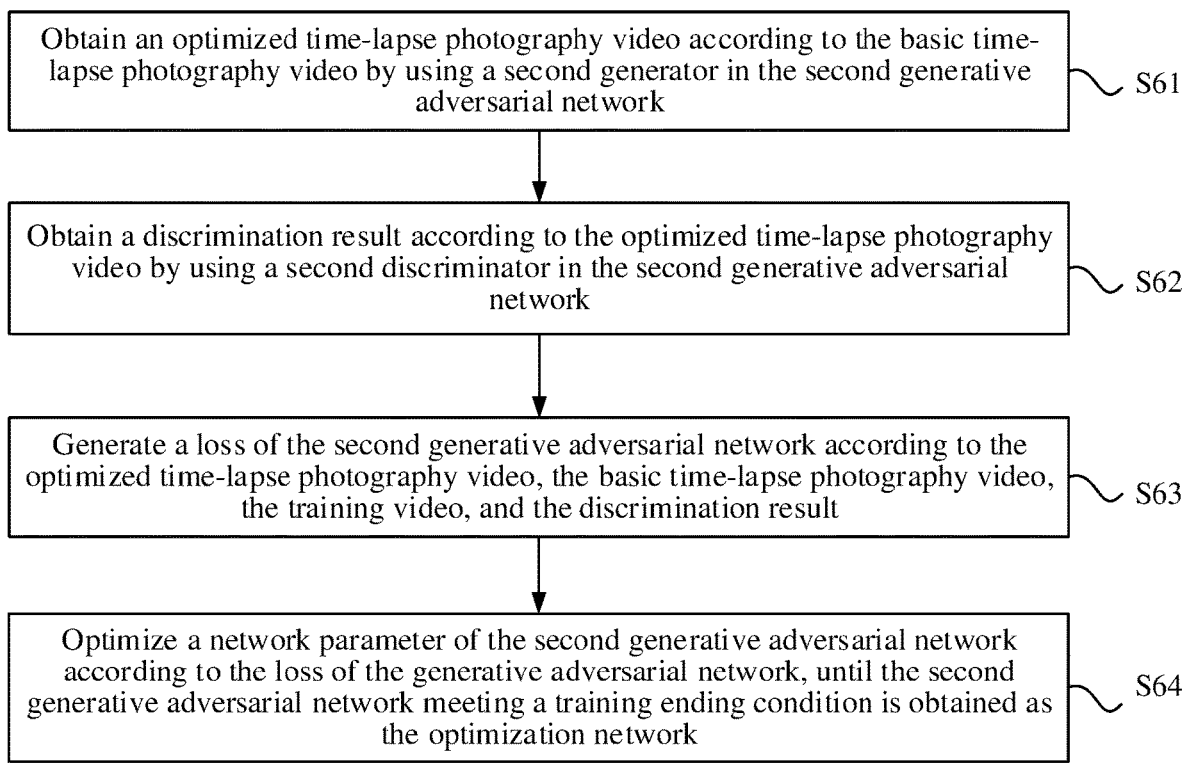
FIG. 6 is a flowchart of an optimization network training method according to an embodiment of this application.

The following describes the optimization network training process in step S33 in detail. FIG. 6 is a flowchart of an optimization network training method according to an embodiment of this application. As shown in FIG. 6, the method includes the following steps:

Step S61. Obtain an optimized time-lapse photography video according to the basic time-lapse photography video by using a second generator in the second generative adversarial network.

The optimization network includes the second generator and a second discriminator. The second generator is configured to perform motion state modeling on the basic time-lapse photography video to obtain the optimized time-lapse photography video, and the second discriminator is configured to determine whether the optimized time-lapse photography video is a real video. If a discrimination result of the second discriminator is that the optimized time-lapse photography video is a real video, it indicates that the optimized time-lapse photography video generated by the second generator has relatively high reality and is relatively natural.

Similar to the basic network, the second generator in the optimization network includes an encoder and a decoder. The encoder may be formed by M convolutional layers, the decoder is formed by M deconvolutional layers, and the encoder is in a symmetrical structure as a whole. M is a positive integer. In addition, the convolutional layer may be optionally specified to be in a jumper connection to the deconvolutional layer symmetrical to the convolutional layer, so that features of the encoder may be better used. Which convolutional layer (or convolutional layers) is (are) specifically specified to be in a jumper connection to the deconvolutional layer symmetrical to the convolutional layer may be determined according to an experiment result after a specific quantity of experiments. This is not limited in this application.

The quantity (M) of the convolutional layers and the quantity (M) of the deconvolutional layers, and configuration of a parameter of each layer may all be adjusted according to actual requirements. For example, M may be equal to 6. This is limited in this application, provided that it is ensured that the resolution of an inputted image keeps consistent with that of an outputted image. That is, in the second generator of the optimization network, the increase and decrease of the quantity of the convolutional layers and the deconvolutional layers do not depart from the protection scope of this application. By comparison, it may be found that the second generator of the optimization network has a structure similar to that of the first generator of the basic network (except for the removal of several jumper connections, the remaining structure is the same).

The second discriminator of the optimization network has the same structure as the first discriminator of the basic network.

Figure 7:
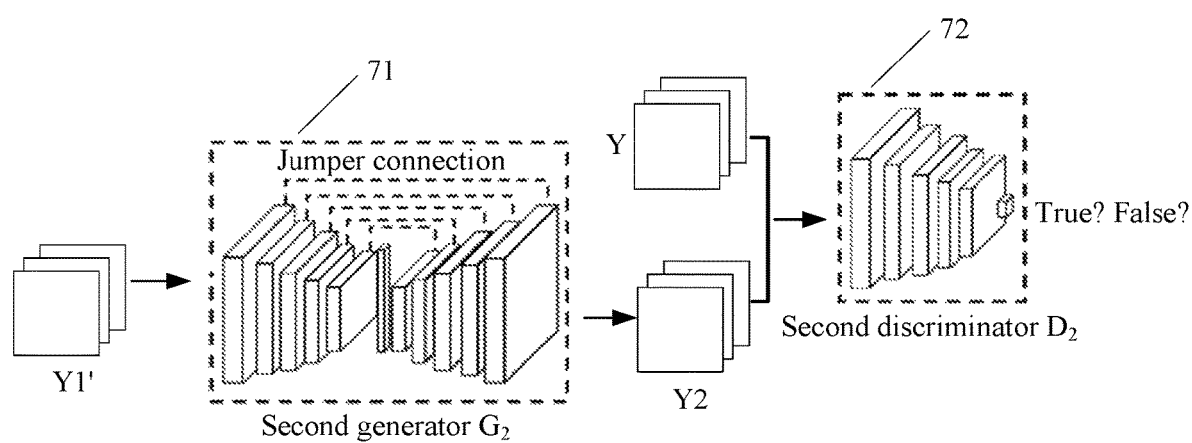
FIG. 7 is a structural diagram of an optimization network according to an embodiment of this application.

FIG. 7 is a structural diagram of an optimization network according to an embodiment of this application. As shown in FIG. 7, the optimization network includes a second generator 71 and a second discriminator 72, Y1' represents a basic time-lapse photography video outputted by the trained basic network, Y represents a training video, and Y2 represents an optimized time-lapse photography video outputted by the second generator.

Step S62. Obtain a discrimination result according to the optimized time-lapse photography video by using a second discriminator in the second generative adversarial network.

Similar to the first discriminator, the second discriminator may discriminate reality of the optimized time-lapse photography video generated by the second discriminator according to the optimized time-lapse photography video and the training video, to obtain a discrimination result. If the similarity between the optimized time-lapse photography video and the training video reaches a preset degree, it is discriminated that the optimized time-lapse photography video is a real video, that is, the optimized time-lapse photography video has relatively high reality.

Step S63. Generate a loss of the second generative adversarial network according to the optimized time-lapse photography video, the basic time-lapse photography video, the training video, and the discrimination result.

Similar to the basic network, model training of the optimization network is implemented by adjusting a parameter to reduce the loss of the second generative adversarial network. The loss includes at least a ranking loss, and the ranking loss is determined according to motion features respectively corresponding to the optimized time-lapse photography video, the basic time-lapse photography video, and the training video.

Optionally, the loss of the second generative adversarial network may be determined according to a content loss, an adversarial loss, and the ranking loss of the second generative adversarial network. Based on this, in some possible implementations, a loss function of the optimization network may be:

a sum of a product of a preset constant and a ranking loss function, the adversarial loss function, and the L1 norm-based content loss function.

An expression of the loss function of the optimization network is:

$$L_{stage1}=L_{adv}+\lambda gL_{rank}+L_{con} \qquad (3).$$

$L_{stage1}$ represents a loss of an optimization network, $L_{adv}$ represents an adversarial loss, $L_{con}$ (that is, $L_{con}(G_2)$) represents a content loss, λ represents a preset constant, and $L_{rank}$ represents a (total) ranking loss. The adversarial loss function and the L1 norm-based content loss function are described in the foregoing. The following focuses on the ranking loss function.

In some possible implementations, a feature of the optimized time-lapse photography video, a feature of the basic time-lapse photography video, and a feature of the training video may be extracted respectively by using the second discriminator in the second generative adversarial network, a Gram matrix corresponding to the optimized time-lapse photography video, a Gram matrix corresponding to the basic time-lapse photography video, and a Gram matrix corresponding to the training video are calculated respectively according to the feature, the Gram matrix being used for representing a motion state between video frames, and then the ranking loss may be determined according to the Gram matrix corresponding to the optimized time-lapse photography video, the Gram matrix corresponding to the basic time-lapse photography video, and the Gram matrix corresponding to the training video. In one implementation, a Gram matrix (or Gramian matrix) of a set of vectors in an inner product space may be the Hermitian matrix of inner products. The ranking loss function is:

$$L_{rank}(Y_1, Y, Y_2) = \sum_l L_{rank}(Y_1, Y, Y_2; l). \quad (4)$$

$L_{rank}(Y_1, Y, Y_2)$ represents a (total) ranking loss, $L_{rank}(Y_1, Y, Y_2; l)$ represents a single-layer (that is, a single feature layer) ranking loss function, l represents a sequence number of a feature layer in the second discriminator, $Y_1$ represents a four-dimensional matrix corresponding to a basic time-lapse photography video, Y represents a four-dimensional matrix corresponding to a training video (to which the image set corresponds), $Y_2$ represents a four-dimensional matrix corresponding to an optimized time-lapse photography video, and $$\sum_l$$

represents a summation. Optionally, l (that is, which feature layers are specifically selected) may be determined according to an experiment result after a specific quantity of experiments.

Optionally, an expression of the single-layer ranking loss function is:

$$L_{rank}(Y_1, Y, Y_2; l) = -\log \frac{e^{-\|g(Y_2;l) - g(Y;l)\|_1}}{e^{-\|g(Y_2;l) - g(Y;l)\|_1} + e^{-\|g(Y_2;l) - g(Y_1;l)\|_1}}. \quad (5)$$

g(Y;l) represents a Gram matrix extracted from a l layer.

Step S64. Optimize a network parameter of the second generative adversarial network according to the loss of the second generative adversarial network, until the second generative adversarial network meeting the training ending condition is obtained as the optimization network.

Specifically, a gradient of each layer is calculated by using the loss of the optimization network, and the parameter of the second generator and the parameter of the second discriminator (for example, a weight and an offset) are updated. The second generative adversarial network is trained by continuously updating the parameter of the second generator and the parameter of the second discriminator. When the training ending condition is met, for example, the loss of the second generative adversarial network is in the convergence state, or is less than the preset value, the second generative adversarial network may be determined as the optimization network.

In the foregoing embodiments, the first generator and the first discriminator are alternately trained. When the first generator is trained, the first discriminator is fixed, and when the first discriminator is trained, the first generator is fixed. Similarly, the second generator and the second discriminator are alternately trained. When the second generator is trained, the second discriminator is fixed, so that the ranking loss is minimized, to ensure that the optimized time-lapse photography video outputted by the second generator is closer to the real video (that is, the video generated by the second generator is more similar to the real video), and is farther away from (that is, increases differentiation) the video inputted into the second generator (that is, the video outputted by the basic network trained to convergence), and when the second discriminator is trained, the second generator is fixed, so that the ranking loss is maximized to enlarge a difference between the optimized time-lapse photography video outputted by the second generator and the real video to facilitate further training of the optimization network subsequently.

The optimization network obtained through training according to this embodiment can further optimize the video outputted by the basic network trained to convergence, mainly reflecting in optimizing the motion information.

Figure 8:
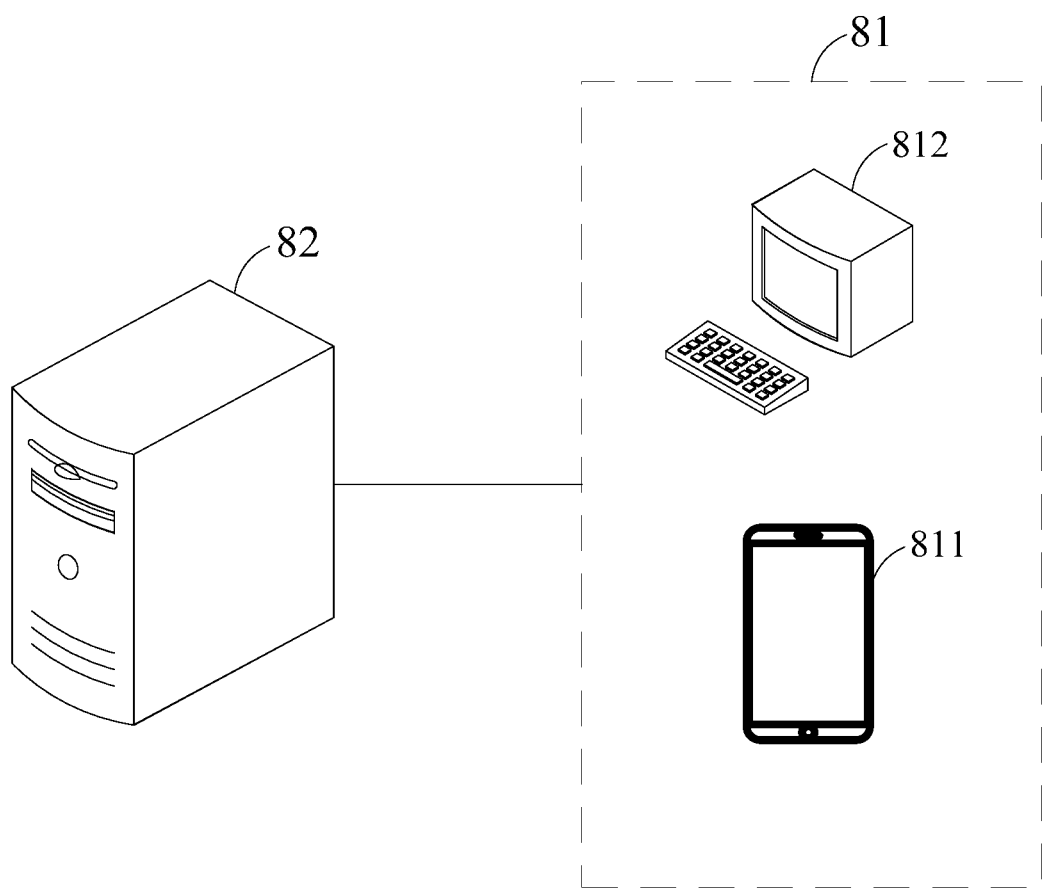
FIG. 8 is a structural diagram of a time-lapse photography video generating system according to an embodiment of this application.

The above is the specific implementations of the time-lapse photography video generating method and the neural network model training method provided by the embodiments of this application. Correspondingly, this application further provides a time-lapse photography video generating system. FIG. 8 is a structural diagram of a time-lapse photography video generating system according to an embodiment of this application. As shown in FIG. 8, the system includes:

a terminal 81 and a server 82, the terminal 81 interacting with the server 82 through a network.

The server 82 is configured to receive a specified image transmitted by the terminal, generate, according to the specified image, an image set including a first preset quantity of frames of the specified images, perform content modeling and motion state modeling on the image set according to the image set by using a pre-trained neural network model, to obtain a time-lapse photography video outputted by the neural network model, and transmit the time-lapse photography video to the terminal. The neural network model is obtained through training according to the foregoing neural network model training method.

It may be understood that operations of the server 82 may further include steps of the training process of the neural network model used for generating the time-lapse photography video described above.

Optionally, the terminal 81 may be a mobile intelligent device 811 such as a smartphone, or may be a local computer device 812 such as a computer.

According to the technical solution provided by the embodiments of this application, a user only needs to upload a specified image by using a local terminal, and a remote server can output a predicted time-lapse photography video based on the specified image by using a neural network model used for generating a time-lapse photography video, and transmit the video to the local terminal, so that the user can easily make a time-lapse photography video, thereby effectively improving user experience.

Meanwhile, the technical solution does not require the local terminal to run the neural network model used for generating the time-lapse photography video, so that the time-lapse photography video can be made without occupying a running resource of the local terminal, thereby effectively reducing the running resource of the local terminal.

Figure 9:
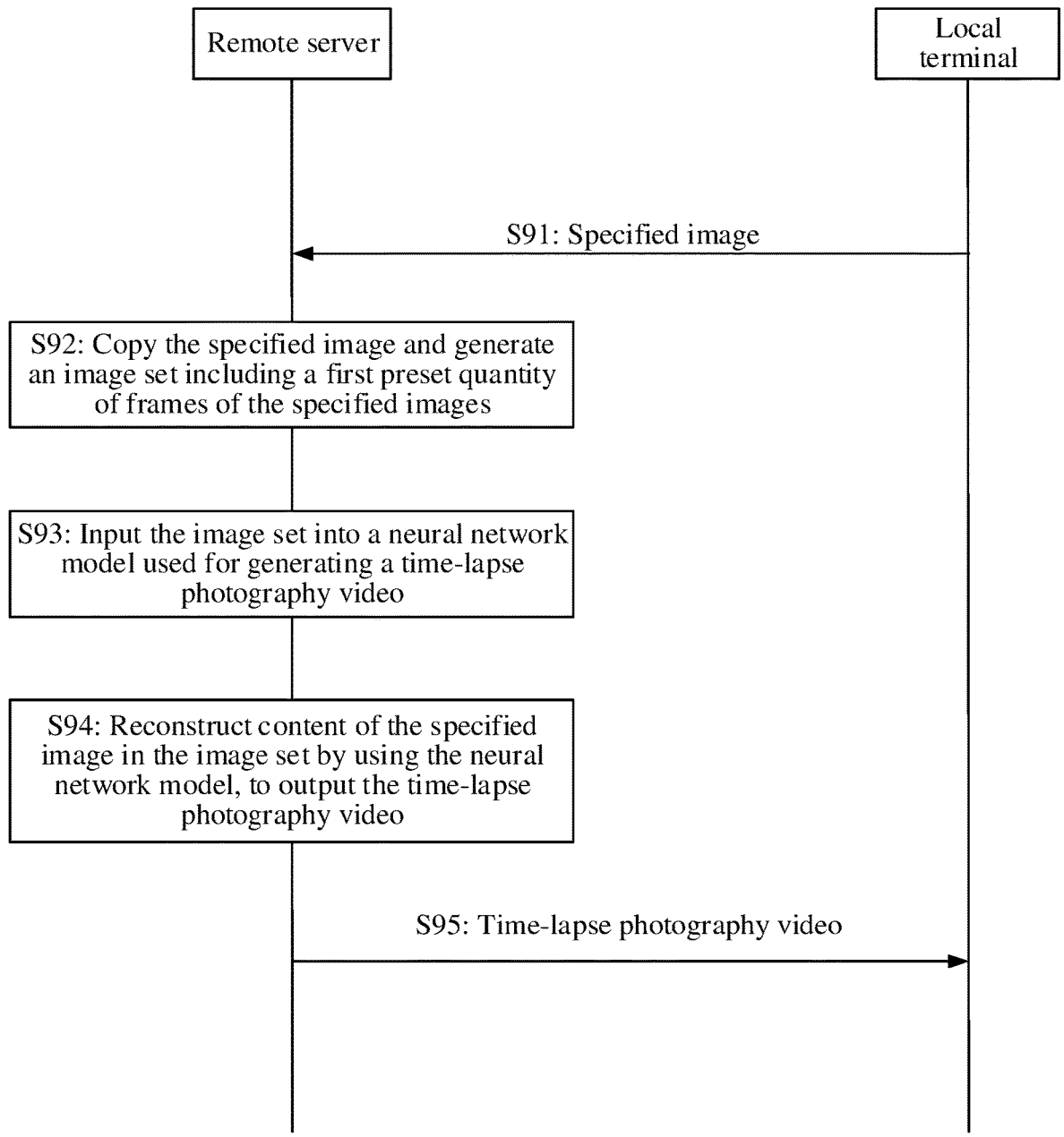
FIG. 9 is a signaling flowchart of a time-lapse photography video generating method according to an embodiment of this application.

Corresponding to the time-lapse photography video generating system provided by the embodiments of this application, this application describes a signaling flow of the time-lapse photography video generating method. FIG. 9 is a signaling flowchart of a time-lapse photography video generating method according to an embodiment of this application. As shown in FIG. 9, the signaling flow includes:

Step S91. A local terminal transmits a specified image to a remote server.

Step S92. The remote server copies the specified image to generate an image set including a first preset quantity of frames of the specified images.

Step S93. The remote server inputs the image set into a neural network model used for generating a time-lapse photography video.

Step S94. Reconstruct content of the specified images in the image set by using the neural network model, to output the time-lapse photography video.

When the specified image is a head-frame image, content modeling may be performed on subsequent multi-frame images, and content in the images is reconstructed, and when the specified image is an end-frame image, content modeling may be performed on multi-frame images before the end-frame image, and content in the images is reconstructed, to generate the time-lapse photography video. Step S95. The remote server transmits the outputted time-lapse photography video to the local terminal.

According to the method, the time-lapse photography video is continuously optimized by a multi-stage generative adversarial network, and a reasonably predicted future frame or historical frame is ensured for the content modeling and the motion state modeling, to generate the time-lapse photography video from crude to fine gradually. According to the method, on one hand, reality of the content and reasonability of motion information are reserved, so that the generated time-lapse photography video has relatively high reality and is relatively natural.

Meanwhile, the technical solution does not require the local terminal to run the neural network model used for generating the time-lapse photography video, so that the time-lapse photography video can be made without occupying a running resource of the local terminal, thereby effectively reducing the running resource of the local terminal.

In addition, the training process of the neural network model used for generating the time-lapse photography video requires a relatively large system resource. Therefore, preferably, the training process of the neural network model used for generating the time-lapse photography video is performed at the remote server side.

To more fully describe the technical solution provided by this application, corresponding to the time-lapse photography video generating method provided by the embodiments of this application, this application discloses a time-lapse photography video generating apparatus.

Figure 10:
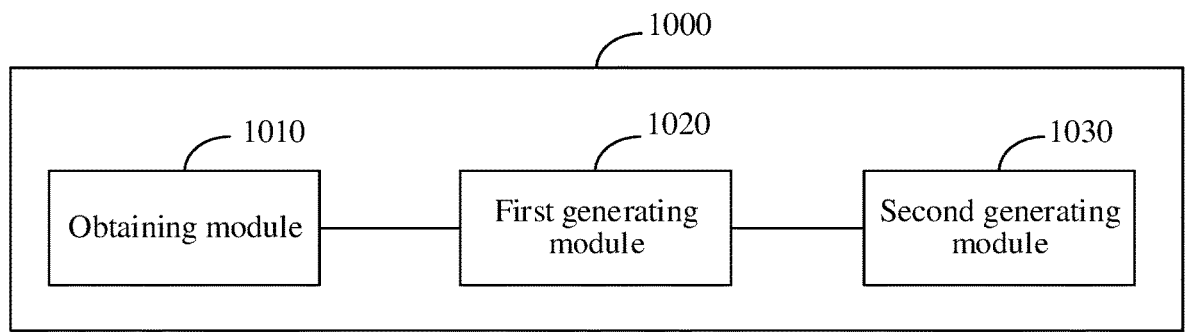
FIG. 10 is a structural diagram of a time-lapse photography video generating apparatus according to an embodiment of this application.

FIG. 10 is a structural diagram of a time-lapse photography video generating apparatus according to an embodiment of this application. The apparatus may be applied to a local terminal, or a remote server side in the time-lapse photography video generating system. As shown in FIG. 10, the apparatus 1000 includes:

an obtaining module 1010, configured to obtain a specified image;

a first generating module 1020, configured to generate, according to the specified image, an image set including a first preset quantity of frames of the specified images; and a second generating module 1030, configured to perform content modeling and motion state modeling on the image set according to the image set by using a pre-trained neural network model, to obtain a time-lapse photography video outputted by the neural network model, the neural network model being obtained through training according to the foregoing neural network model training method.

Optionally, in a case that the electronic device is a terminal device, and the terminal device is provided with the neural network model, the obtaining module 1010 is specifically configured to:

obtain a picture selected in an album as the specified image in response to a selection instruction; or obtain a shot picture as the specified image in response to a shooting instruction.

Optionally, in a case that the electronic device is a server, the obtaining module 1010 is specifically configured to:

receive a time-lapse photography generating request transmitted by the terminal device, the time-lapse photography generating request carrying the specified image; and obtain the specified image from the time-lapse photography generating request.

According to the time-lapse photography video generating apparatus provided by this embodiment of this application, a specified image is first obtained, a specified image set including a first preset quantity of frames of the specified images is generated according to the specified image, and then content modeling and motion state modeling are performed on the specified image set by using a pre-trained neural network model, to obtain a time-lapse photography video outputted by the neural network model. According to the apparatus, the time-lapse photography video is continuously optimized by a multi-stage generative adversarial network, and a reasonably predicted future frame is ensured for the content modeling and the motion state modeling, to generate the time-lapse photography video from crude to fine gradually. According to the apparatus, on one hand, reality of the content and reasonability of motion information are reserved, so that the generated time-lapse photography video has relatively high reality and is relatively natural. On the other hand, the model used in the apparatus is a cascaded dual network structure, which is easy to implement and simplify and may be applied to a cloud or an offline scenario.

Figure 11:
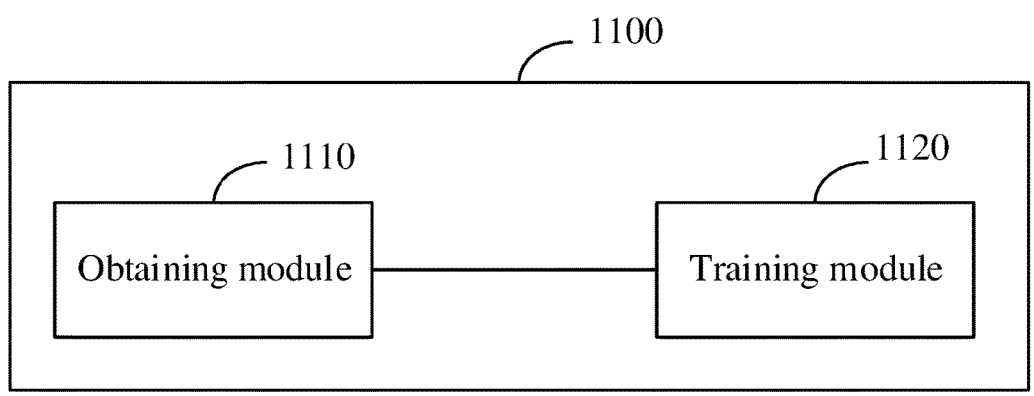
FIG. 11 is a structural diagram of a neural network model training apparatus according to an embodiment of this application.

Optionally, FIG. 11 is a structural diagram of a neural network model training apparatus according to an embodiment of this application. As shown in FIG. 11, the apparatus 1100 includes:

an obtaining module 1110, configured to obtain a training sample, the training sample including a training video and an image set corresponding to the training video, and the image set including a head-frame image or an end-frame image in the training video with a first preset quantity of frames; and a training module 1120, configured to obtain, through training according to the training sample, a neural network model meeting a training ending condition, the neural network model including a basic network used for performing content modeling on a time-lapse photography video and an optimization network used for performing motion state modeling on the time-lapse photography video, the basic network being a first generative adversarial network using the image set including the first preset quantity of frames of same images as an input and using a basic time-lapse photography video as an output; and the optimization network being a second generative adversarial network using the output of the basic network as an input and using an optimized time-lapse photography video as an output.

Figure 12:
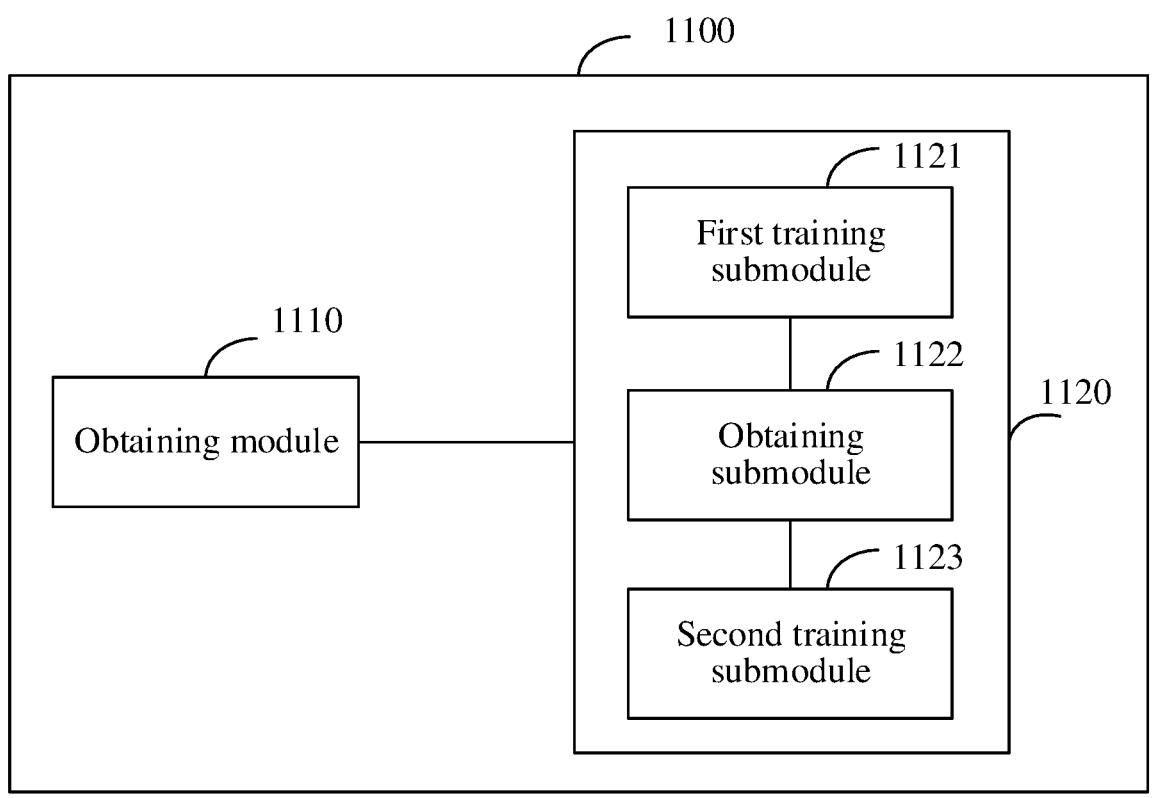
FIG. 12 is a structural diagram of another neural network model training apparatus according to an embodiment of this application.

Optionally, FIG. 12 is a structural diagram of another neural network model training apparatus according to an embodiment of this application. As shown in FIG. 12, the apparatus 1100 includes the modules described in FIG. 11 and the corresponding embodiments, and the training module 1120 specifically includes:

a first training submodule 1121, configured to obtain, through training according to the training sample, a first generative adversarial network meeting a training ending condition as a basic network;

an obtaining submodule 1122, configured to obtain, according to an image set corresponding to the training video through the basic network, a basic time-lapse photography video outputted by the basic network; and a second training submodule 1123, configured to obtain, through training according to the basic time-lapse photography video and the training video, a second generative adversarial network meeting the training ending condition as an optimization network.

Optionally, the second training submodule 1123 is specifically configured to:

obtain an optimized time-lapse photography video according to the basic time-lapse photography video by using a second generator in the second generative adversarial network;

obtain a discrimination result according to the optimized time-lapse photography video by using a second discriminator in the second generative adversarial network;

generate a loss of the second generative adversarial network according to the optimized time-lapse photography video, the basic time-lapse photography video, the training video, and the discrimination result, the loss including at least a ranking loss, and the ranking loss being determined according to motion features respectively corresponding to the optimized time-lapse photography video, the basic time-lapse photography video, and the training video; and optimize a network parameter of the second generative adversarial network according to the loss of the second generative adversarial network, until the second generative adversarial network meeting the training ending condition is obtained as the optimization network.

Optionally, the apparatus further includes a determining module, configured to determine the loss of the second generative adversarial network in the following manners:

extracting a feature of the optimized time-lapse photography video, a feature of the basic time-lapse photography video, and a feature of the training video respectively by using the second discriminator in the second generative adversarial network, and calculating a Gram matrix corresponding to the optimized time-lapse photography video, a Gram matrix corresponding to the basic time-lapse photography video, and a Gram matrix corresponding to the training video respectively according to the feature of the optimized time-lapse photography video, the feature of the basic time-lapse photography video, and the feature of the training video, and the Gram matrix being used for representing a motion state between video frames;

determining a ranking loss according to the Gram matrix corresponding to the optimized time-lapse photography video, the Gram matrix corresponding to the basic time-lapse photography video, and the Gram matrix corresponding to the training video; and determining the loss of the second generative adversarial network according to a content loss, an adversarial loss, and the ranking loss of the second generative adversarial network.

Optionally, the obtaining module 1110 is specifically configured to:

obtain a training video;

extract a head-frame image or an end-frame image from the training video;

copy the head-frame image or the end-frame image, to generate an image set corresponding to the training video; and use the training video and the image set corresponding to the training video as the training sample.

Based on the foregoing, this application provides a dual network structure-based neural network model generating method. The dual network structure specifically includes a basic network used for performing content modeling on a time-lapse photography video and an optimization network used for performing motion state modeling on the time-lapse photography video. The basic network is a first generative adversarial network using a video including a first preset quantity of frames of specified frame images as an input and using a basic time-lapse photography video as an output; and the optimization network is a second generative adversarial network using the output of the basic network as an input and used for performing motion state modeling on the time-lapse photography video and using an optimized time-lapse photography video as an output. After a plurality of training videos are obtained, image sets corresponding to the training videos are generated according to the training videos. The image set includes a head-frame image or an end-frame image in the training video with a first preset quantity of frames. A neural network model formed through the basic network and the optimization network is trained by using the training videos and the image sets corresponding to the training videos, and when a training ending condition is met, the video may be used for generating the time-lapse photography video. According to the neural network model trained by the apparatus, the time-lapse photography video is continuously optimized by a multi-stage generative adversarial network, and a reasonably predicted future frame or historical frame is ensured for the content modeling and the motion state modeling, to generate the time-lapse photography video from crude to fine gradually. According to the method, on one hand, reality of the content and reasonability of motion information are reserved, so that the generated time-lapse photography video has relatively high reality and is relatively natural. On the other hand, the neural network model trained by the apparatus is a cascaded dual network structure, which is easy to implement and simplify and may be applied to a cloud or an offline scenario.

To more fully describe the technical solution provided by this application, corresponding to the time-lapse photography video generating method provided by the embodiments of this application, this application discloses an electronic device. The electronic device may be, for example, a local terminal (for example, a local computer and a mobile terminal), or a remote server.

Figure 13:
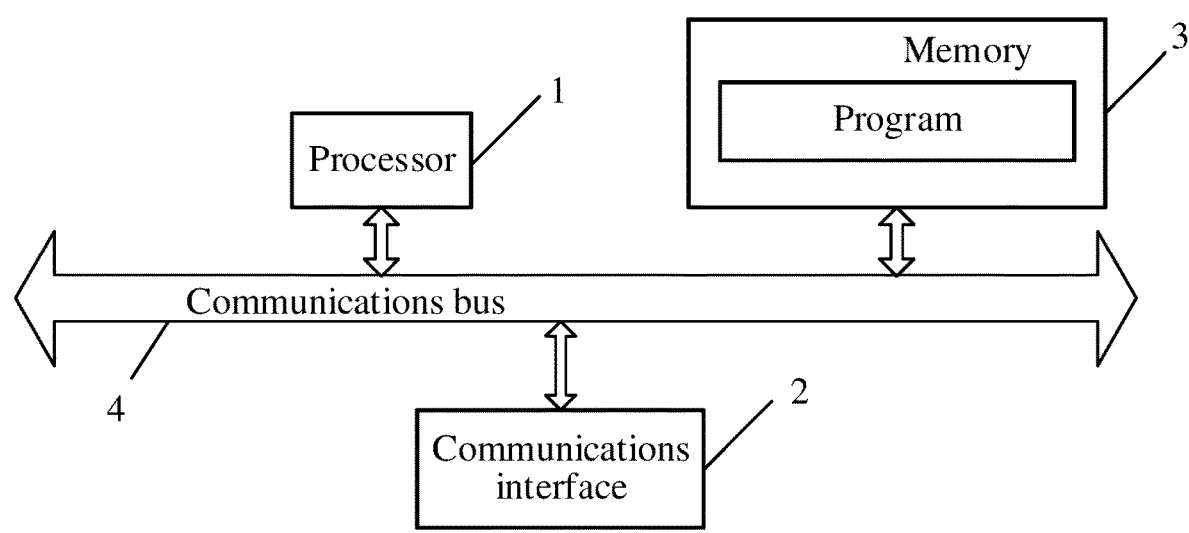
FIG. 13 is a hardware structural diagram of an electronic device according to an embodiment of this application.

FIG. 13 is a hardware structural diagram of an electronic device according to an embodiment of this application. As shown in FIG. 13, the electronic device includes:

a processor 1, a communications interface 2, a memory 3, and a communications bus 4.

The processor 1, the communications interface 2, and the memory 3 perform mutual communication by using the communications bus 4.

The processor 1 is configured to invoke and execute a program stored in the memory.

The memory 3 is configured to store the program.

The program may include program code, and the program code includes a computer operation instruction. In this embodiment of this application, the program may include: a program corresponding to the training method of the neural network model used for generating the time-lapse photography video, and a program corresponding to the time-lapse photography video generating method, or any one of the two programs.

The processor 1 may be a central processing unit (CPU) or an application-specific integrated circuit (ASIC) or may be configured as one or more integrated circuits for implementing the embodiments of this application.

The memory 3 may include a high-speed random access memory (RAM), or may further include a non-volatile memory, for example, at least one magnetic disk memory.

The program may be specifically configured to:

obtain a specified image;

generate, according to the specified image, an image set including a first preset quantity of frames of the specified images; and perform content modeling and motion state modeling on the image set according to the image set by using a pre-trained neural network model, to obtain a time-lapse photography video outputted by the neural network model, the neural network model being obtained through training according to the neural network model training method.

Optionally, the program is further configured to perform steps of any implementation of the time-lapse photography generating method provided by the embodiments of this application.

In addition, an embodiment of this application further provides a storage medium. The storage medium stores a computer program, and when executed by a processor, the computer program is configured to implement steps of the neural network model training method, and/or being configured to implement steps of the time-lapse photography video generating method in the foregoing embodiments.

The following briefly describes an actual application scenario of this application. For example, when a user wants to make a time-lapse photography video with sky as an actual scenario, by applying the technical solution provided by this application, the user may make it in two manners:

A first manner is that the user makes it on a local terminal, and an operation performed by the local terminal includes:

obtaining a specified image provided by the user, where the specified image may be a picture of the sky shot by the user on the site, or an existing picture of the sky selected by the user, copying the specified image to generate an image set including a first preset quantity of frames of the specified images, inputting the image set into a neural network model used for generating a time-lapse photography video, performing content modeling and motion state modeling by using the neural network model, reconstructing content of the specified images, and outputting an optimized time-lapse photography video.

In the manner, the neural network model used for generating the time-lapse photography video is preset in the local terminal, that is, the local terminal may generate the time-lapse photography video independently.

A second manner is that the user operates in the local terminal, and obtains the time-lapse photography video by using the remote server. A specific process is as follows:

transmitting, by the local terminal, a specified image to the remote server, where the specified image may be a picture of the sky shot by the user on the site, or an existing picture of the sky selected by the user;

copying, by the remote server, the specified image, to generate an image set including a first preset quantity of frames of the specified images, inputting the image set into a neural network model used for generating a time-lapse photography video, performing content modeling and motion state modeling by using the neural network model, reconstructing content of the images, and outputting an optimized time-lapse photography.

In the manner, the user only needs to transmit the picture of the sky to the remote server by using the local terminal, the neural network model used for generating the time-lapse photography video is preset in the remote server, and the remote server generates the time-lapse photography video predicted by the picture of the sky, and then transmits the video to the local terminal of the user.

It may be known from the foregoing technical solutions that, compared with the related art, this application provides the neural network model training method and device, and a time-lapse photography video generating method and device. According to the technical solutions, this application provides a dual network structure-based neural network model used for generating a time-lapse photography video. The dual network structure specifically includes a basic network used for performing content modeling on a time-lapse photography video and an optimization network used for performing motion state modeling on the time-lapse photography video. The basic network is a first generative adversarial network using a video including a first preset quantity of frames of specified frame images as an input and using a basic time-lapse photography video as an output; and the optimization network is a second generative adversarial network using the output of the basic network as an input and used for performing motion state modeling on the time-lapse photography video, and using an optimized time-lapse photography video as an output. After a plurality of training videos are obtained, image sets corresponding to the training videos are generated according to the training videos. The image set includes a head-frame image or an end-frame image in the training video with a first preset quantity of frames. A neural network model formed by the basic network and the optimization network is trained by using the training videos and the image sets corresponding to the training videos, and when a training ending condition is met, the video may be used for generating the time-lapse photography video.

Before a time-lapse photography video is generated, a specified image is first obtained, a specified image set including a first preset quantity of frames of the specified images is generated according to the specified image, and then content modeling and motion state modeling are performed on the specified image set by using a pre-trained neural network model, to obtain a time-lapse photography video outputted by the neural network model.

According to the technical solution, the time-lapse photography video is continuously optimized by a multi-stage generative adversarial network, and a reasonably predicted future frame is ensured for the content modeling and the motion state modeling, to generate the time-lapse photography video from crude to fine gradually. On one hand, reality of the content and reasonableness of motion information are reserved, so that the generated time-lapse photography video has relatively high reality and is relatively natural. On the other hand, the model to be used is a cascaded dual network structure, which is easy to implement and simplify, and may be applied to a cloud or an offline scenario.

Finally, in this specification, relational terms such as first and second are only used to distinguish one entity or operation from another, and do not necessarily require or imply that any actual relationship or sequence exists between these entities or operations. Moreover, the terms "include", "comprise", or their any other variant are intended to cover a non-exclusive inclusion, so that a process, a method, an article, or a device that includes a list of elements not only includes those elements but also includes other elements that are not expressly listed, or further includes elements inherent to such a process, method, article, or device. Unless otherwise specified, an element limited by "include a/an . . . " does not exclude other same elements existing in the process, the method, the article, or the intelligent device that includes the element.

The embodiments in the specification are all described in a progressive manner. For same or similar parts in the embodiments, refer to these embodiments, and each embodiment focuses on a difference from other embodiments. The apparatus, system, intelligent device, and storage medium disclosed in the embodiments are basically similar to the method disclosed in the embodiment, and therefore is described briefly; for related parts, reference may be made to partial descriptions of the method.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has described compositions and steps of each example in general according to functions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

In combination with the embodiments herein, steps of the method or algorithm described may be directly implemented using hardware, a software module executed by a processor, or the combination thereof. The software module may be disposed in a random access memory (RAM), a memory, a read-only memory (ROM), an electrically programmable ROM, an electrically erasable programmable ROM, or a register in any other forms well-known in the art.

The embodiments disclosed above are described to enable a person skilled in the art to implement or use this application. Various modifications to the embodiments are obvious to the person skilled in the art, and general principles defined in this specification may be implemented in other embodiments without departing from the spirit or scope of this application. Therefore, this application will not be limited to the embodiments described in this specification but extends to the widest scope that complies with the principles and novelty disclosed in this specification.

What is claimed is:

1. A method for generating a time-lapse photography video with a neural network model, the method comprising:
   obtaining, by a device comprising a memory storing instructions and a processor in communication with the memory, a training sample, the training sample comprising a training video and an image set corresponding to the training video, the image set comprising an end image in the training video, and the image set comprising a first preset quantity of frames; and
   obtaining, by the device, through training according to the training sample, a neural network model to satisfy a training ending condition, the neural network model comprising a basic network and an optimization network, by:
      using the image set as an input to the basic network, the basic network being a first generative adversarial network for performing content modeling,
      generating a basic time-lapse photography video as an output of the basic network,
      using the basic time-lapse photography video as an input to the optimization network, the optimization network being a second generative adversarial network for performing motion state modeling, and
      generating an optimized time-lapse photography video as an output of the optimization network;
   wherein the obtaining, through training according to the training sample, the neural network model to satisfy the training ending condition comprises:
      obtaining, through training according to the training sample, the first generative adversarial network to satisfy a first training ending condition as the basic network;
      obtaining, through the basic network according to the image set corresponding to the training video, the basic time-lapse photography video outputted by the basic network; and
      obtaining, through training according to the basic time-lapse photography video and the training video, the second generative adversarial network to satisfy a second training ending condition as the optimization network, by:
         obtaining the optimized time-lapse photography video according to the basic time-lapse photography video by using a second generator in the second generative adversarial network;
         obtaining a discrimination result according to the optimized time-lapse photography video by using a second discriminator in the second generative adversarial network;
         generating a loss of the second generative adversarial network according to the optimized time-lapse photography video, the basic time-lapse photography video, the training video, and the discrimination result, the loss comprising a ranking loss determined according to motion features respectively corresponding to the optimized time-lapse photography video, the basic time-lapse photography video, and the training video; and
         optimizing a network parameter of the second generative adversarial network according to the loss of the second generative adversarial network, until the second generative adversarial network satisfies the second training ending condition so as to be as the optimization network.

2. The method according to claim 1, further comprising:
obtaining, by the device, a loss of the second generative adversarial network by:
extracting a feature of the optimized time-lapse photography video, a feature of the basic time-lapse photography video, and a feature of the training video respectively by using a second discriminator in the second generative adversarial network;
calculating a Gram matrix corresponding to the optimized time-lapse photography video, a Gram matrix corresponding to the basic time-lapse photography video, and a Gram matrix corresponding to the training video respectively according to the feature of the optimized time-lapse photography video, the feature of the basic time-lapse photography video, and the feature of the training video, the Gram matrix being used for representing a motion state between video frames;
determining a ranking loss according to the Gram matrix corresponding to the optimized time-lapse photography video, the Gram matrix corresponding to the basic time-lapse photography video, and the Gram matrix corresponding to the training video; and
determining the loss of the second generative adversarial network according to a content loss, an adversarial loss, and the ranking loss of the second generative adversarial network.

3. The method according to claim 1, wherein the obtaining the training sample comprises:
obtaining, by the device, the training video;
extracting, by the device, the end image from the training video;
copying, by the device, the end image to generate the image set corresponding to the training video; and
using, by the device, the training video and the image set as the training sample.

4. The method according to claim 1, further comprising:
obtaining, by the device, a specified image;
generating, by the device, an image set according to the specified image, the specified image set comprising the first preset quantity of frames; and
performing, by the device, content modeling and motion state modeling on the specified image set by using the neural network model, to obtain a time-lapse photography video outputted by the neural network model.

5. The method according to claim 4, wherein the obtaining the specified image comprises:
receiving, by the device, a time-lapse photography generating request, the time-lapse photography generating request comprising the specified image; and
obtaining, by the device, the specified image from the time-lapse photography generating request.

6. An apparatus for generating a time-lapse photography video with a neural network model, the apparatus comprising:
a memory storing instructions; and
a processor in communication with the memory, wherein, when the processor executes the instructions, the processor is configured to cause the apparatus to:
obtain a training sample, the training sample comprising a training video and an image set corresponding to the training video, the image set comprising an end image in the training video, and the image set comprising a first preset quantity of frames, and
obtain, through training according to the training sample, a neural network model to satisfy a training ending condition, the neural network model comprising a basic network and an optimization network, by:
using the image set as an input to the basic network, the basic network being a first generative adversarial network for performing content modeling,
generating a basic time-lapse photography video as an output of the basic network,
using the basic time-lapse photography video as an input to the optimization network, the optimization network being a second generative adversarial network for performing motion state modeling, and
generating an optimized time-lapse photography video as an output of the optimization network,
wherein, when the processor is configured to cause the apparatus to obtain, through training according to the training sample, the neural network model to satisfy the training ending condition, the processor is configured to cause the apparatus to:
obtain, through training according to the training sample, the first generative adversarial network to satisfy a first training ending condition as the basic network;
obtain, through the basic network according to the image set corresponding to the training video, the basic time-lapse photography video outputted by the basic network; and
obtain, through training according to the basic time-lapse photography video and the training video, the second generative adversarial network to satisfy a second training ending condition as the optimization network, by:
obtaining the optimized time-lapse photography video according to the basic time-lapse photography video by using a second generator in the second generative adversarial network;
obtaining a discrimination result according to the optimized time-lapse photography video by using a second discriminator in the second generative adversarial network;
generating a loss of the second generative adversarial network according to the optimized time-lapse photography video, the basic time-lapse photography video, the training video, and the discrimination result, the loss comprising a ranking loss determined according to motion features respectively corresponding to the optimized time-lapse photography video, the basic time-lapse photography video, and the training video; and
optimizing a network parameter of the second generative adversarial network according to the loss of the second generative adversarial network, until the second generative adversarial network satisfies the second training ending condition so as to be as the optimization network.

7. The apparatus according to claim 6, wherein, when the processor executes the instructions, the processor is configured to further cause the apparatus to:
obtain a loss of the second generative adversarial network by:
extracting a feature of the optimized time-lapse photography video, a feature of the basic time-lapse photography video, and a feature of the training video respectively by using a second discriminator in the second generative adversarial network;

calculating a Gram matrix corresponding to the optimized time-lapse photography video, a Gram matrix corresponding to the basic time-lapse photography video, and a Gram matrix corresponding to the training video respectively according to the feature of the optimized time-lapse photography video, the feature of the basic time-lapse photography video, and the feature of the training video, the Gram matrix being used for representing a motion state between video frames;

determining a ranking loss according to the Gram matrix corresponding to the optimized time-lapse photography video, the Gram matrix corresponding to the basic time-lapse photography video, and the Gram matrix corresponding to the training video; and determining the loss of the second generative adversarial network according to a content loss, an adversarial loss, and the ranking loss of the second generative adversarial network.

8. The apparatus according to claim 6, wherein, when the processor is configured to cause the apparatus to obtain the training sample, the processor is configured to cause the apparatus to:

obtain the training video;
extract the end image from the training video;
copy the end image to generate the image set corresponding to the training video; and
use the training video and the image set as the training sample.

9. The apparatus according to claim 6, wherein, when the processor executes the instructions, the processor is configured to cause the apparatus to:

obtain a specified image;
generate an image set according to the specified image, the specified image set comprising the first preset quantity of frames; and
perform content modeling and motion state modeling on the specified image set by using the neural network model, to obtain a time-lapse photography video outputted by the neural network model.

10. The apparatus according to claim 9, wherein, when the processor is configured to cause the apparatus to obtain the specified image, the processor is configured to cause the apparatus to:

receive a time-lapse photography generating request, the time-lapse photography generating request comprising the specified image; and
obtain the specified image from the time-lapse photography generating request.

11. A non-transitory computer readable storage medium storing computer readable instructions, wherein, the computer readable instructions, when executed by a processor, are configured to cause the processor to perform:

obtaining a training sample, the training sample comprising a training video and an image set corresponding to the training video, the image set comprising an end image in the training video, and the image set comprising a first preset quantity of frames; and
obtaining, through training according to the training sample, a neural network model to satisfy a training ending condition, the neural network model comprising a basic network and an optimization network, by:
using the image set as an input to the basic network, the basic network being a first generative adversarial network for performing content modeling,
generating a basic time-lapse photography video as an output of the basic network,
using the basic time-lapse photography video as an input to the optimization network, the optimization network being a second generative adversarial network for performing motion state modeling, and
generating an optimized time-lapse photography video as an output of the optimization network,
wherein, when the computer readable instructions are configured to cause the processor to perform obtaining, through training according to the training sample, the neural network model to satisfy the training ending condition, the computer readable instructions are configured to cause the processor to perform:
obtaining, through training according to the training sample, the first generative adversarial network to satisfy a first training ending condition as the basic network;
obtaining, through the basic network according to the image set corresponding to the training video, the basic time-lapse photography video outputted by the basic network; and
obtaining, through training according to the basic time-lapse photography video and the training video, the second generative adversarial network to satisfy a second training ending condition as the optimization network, by:
obtaining the optimized time-lapse photography video according to the basic time-lapse photography video by using a second generator in the second generative adversarial network;
obtaining a discrimination result according to the optimized time-lapse photography video by using a second discriminator in the second generative adversarial network;
generating a loss of the second generative adversarial network according to the optimized time-lapse photography video, the basic time-lapse photography video, the training video, and the discrimination result, the loss comprising a ranking loss determined according to motion features respectively corresponding to the optimized time-lapse photography video, the basic time-lapse photography video, and the training video; and
optimizing a network parameter of the second generative adversarial network according to the loss of the second generative adversarial network, until the second generative adversarial network satisfies the second training ending condition so as to be as the optimization network.

12. The non-transitory computer readable storage medium according to claim 11, wherein, when executed by the processor, the computer readable instructions are configured to further cause the processor to perform:

obtaining a loss of the second generative adversarial network by:
extracting a feature of the optimized time-lapse photography video, a feature of the basic time-lapse photography video, and a feature of the training video respectively by using a second discriminator in the second generative adversarial network;
calculating a Gram matrix corresponding to the optimized time-lapse photography video, a Gram matrix corresponding to the basic time-lapse photography video, and a Gram matrix corresponding to the training video respectively according to the feature of the optimized time-lapse photography video, the feature of the basic time-lapse photography video, and the feature of the training video, the Gram matrix being used for representing a motion state between video frames;

determining a ranking loss according to the Gram matrix corresponding to the optimized time-lapse photography video, the Gram matrix corresponding to the basic time-lapse photography video, and the Gram matrix corresponding to the training video; and determining the loss of the second generative adversarial network according to a content loss, an adversarial loss, and the ranking loss of the second generative adversarial network.

13. The non-transitory computer readable storage medium according to claim 11, wherein, when the computer readable instructions are configured to cause the processor to perform obtaining the training sample, the computer readable instructions are configured to cause the processor to perform:

obtaining the training video;

extracting the end image from the training video;

copying the end image to generate the image set corresponding to the training video; and using the training video and the image set as the training sample.

14. The non-transitory computer readable storage medium according to claim 11, wherein, when executed by the processor, the computer readable instructions are configured to further cause the processor to perform:

obtaining a specified image by:

receiving a time-lapse photography generating request, the time-lapse photography generating request comprising the specified image, and obtaining the specified image from the time-lapse photography generating request;

generating an image set according to the specified image, the specified image set comprising the first preset quantity of frames; and performing content modeling and motion state modeling on the specified image set by using the neural network model, to obtain a time-lapse photography video outputted by the neural network model.

* * * * *